US012390821B2

(12) United States Patent
Earles et al.

(10) Patent No.: US 12,390,821 B2
(45) Date of Patent: Aug. 19, 2025

(54) FLUID SPRAYER WITH COVERED BATTERY

(71) Applicant: Graco Minnesota Inc., Minneapolis, MN (US)

(72) Inventors: Jeffrey A. Earles, Lakeville, MN (US); Brian M. Mulgrew, St. Francis, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 18/783,116

(22) Filed: Jul. 24, 2024

(65) Prior Publication Data

US 2024/0375133 A1 Nov. 14, 2024

Related U.S. Application Data

(63) Continuation of application No. 17/839,032, filed on Jun. 13, 2022, now Pat. No. 12,097,524.

(60) Provisional application No. 63/223,862, filed on Jul. 20, 2021.

(51) Int. Cl.
*B05B 9/08* (2006.01)
*B05B 9/00* (2006.01)
*B05B 15/00* (2018.01)
*B08B 3/02* (2006.01)
*F04B 17/03* (2006.01)
*F04B 17/06* (2006.01)
(Continued)

(52) U.S. Cl.
CPC ............ *B05B 9/0861* (2013.01); *B05B 9/007* (2013.01); *B05B 15/00* (2013.01); *B08B 3/026* (2013.01); *F04B 17/03* (2013.01); *F04B 17/06* (2013.01); *F04B 23/02* (2013.01); *H01M 50/271* (2021.01); *B08B 2203/0223* (2013.01); *H01M 2220/30* (2013.01)

(58) Field of Classification Search
CPC ....... B05B 15/00; B05B 9/007; B05B 9/0861; B08B 3/026; B08B 2203/0223; F04B 17/03; F04B 17/06; F04B 23/02; H01M 50/271; H01M 2220/30
See application file for complete search history.

(56) References Cited

U.S. PATENT DOCUMENTS

| 5,752,661 A | 5/1998 | Lewis |
| D440,477 S | 4/2001 | Pappas |
| 8,596,555 B2 | 12/2013 | Thompson et al. |

(Continued)

FOREIGN PATENT DOCUMENTS

| CN | 102421533 A | 4/2012 |
| CN | 106460833 A | 2/2017 |

(Continued)

OTHER PUBLICATIONS

Extended European Search Report for EP Application No. 22185902.8, Dated Nov. 23, 2022, pp. 11.

(Continued)

*Primary Examiner* — Peter J Bertheaud
(74) *Attorney, Agent, or Firm* — Kinney & Lange, P.A.

(57) ABSTRACT

A battery powered fluid sprayer includes a shelter that the battery is mounted in to provide power to the electric components of the sprayer. The shelter protects the battery (Continued)

from falling fluid droplets. The shelter extends above the battery and projects outward laterally and longitudinally to protect the battery. The battery can move vertically downward to dismount from the fluid sprayer.

20 Claims, 6 Drawing Sheets

(51) Int. Cl.
*F04B 23/02* (2006.01)
*H01M 50/271* (2021.01)

(56) References Cited

U.S. PATENT DOCUMENTS

| | | | |
|---|---|---|---|
| 10,077,771 | B2 | 9/2018 | Davidson et al. |
| 10,562,052 | B2 | 2/2020 | Fontaine |
| 2007/0204603 | A1 | 9/2007 | Jacobs et al. |
| 2007/0278326 | A1 | 12/2007 | Wu |
| 2011/0297756 | A1 | 12/2011 | Peterson et al. |
| 2015/0050169 | A1 | 2/2015 | Horie et al. |
| 2015/0251223 | A1 | 9/2015 | Horie et al. |
| 2016/0038960 | A1 | 2/2016 | Fontaine |
| 2017/0066119 | A1 | 3/2017 | Fu et al. |
| 2018/0154386 | A1 | 6/2018 | Zhang |
| 2019/0072085 | A1 | 3/2019 | Schultz |
| 2019/0224703 | A1 | 7/2019 | Gustafson et al. |
| 2021/0367305 | A1 | 11/2021 | Wrobel et al. |
| 2022/0025882 | A1 | 1/2022 | Horning et al. |

FOREIGN PATENT DOCUMENTS

| | | |
|---|---|---|
| CN | 206064968 U | 4/2017 |
| CN | 106794481 A | 5/2017 |
| CN | 108008743 A | 5/2018 |
| CN | 110753602 A | 2/2020 |
| CN | 111482293 A | 8/2020 |
| EP | 1863106 A1 | 12/2007 |
| EP | 3159541 A1 | 4/2017 |
| JP | H0634950 A | 2/1994 |
| JP | 2004267883 A | 9/2004 |
| JP | 2006015208 A | 1/2006 |
| JP | 2012030165 A | 2/2012 |
| JP | 2014100114 A | 6/2014 |
| WO | 2014119130 A1 | 8/2014 |
| WO | 2018132790 A1 | 7/2018 |
| WO | 2018140753 A1 | 8/2018 |
| WO | 2019161995 A1 | 8/2019 |
| WO | 2020044940 A1 | 3/2020 |
| WO | 2020112809 A1 | 6/2020 |
| WO | 2022073170 A1 | 4/2022 |

OTHER PUBLICATIONS

First Communication Pursuant to Article 94(3) EPC for EP Application No. 22185902.8, Dated Oct. 2, 2024.

FLUID SPRAYER WITH COVERED BATTERY

CROSS-REFERENCE TO RELATED APPLICATIONS

This application is a continuation of U.S. application Ser. No. 17/839,032 filed Jun. 13, 2022, for "FLUID SPRAYER WITH COVERED BATTERY," which in turn claims the benefit of U.S. Provisional Application No. 63/223,862 filed Jul. 20, 2021, and entitled "FLUID SPRAYER WITH COVERED BATTERY," the disclosure of which is hereby incorporated by reference in its entirety.

BACKGROUND

The present disclosure relates generally to fluid sprayers. More specifically, the disclosure relates to battery powered fluid sprayers.

Sprayers apply spray fluid to a surface through a nozzle. A pump draws the spray fluid from a reservoir, pressurizes the fluid, and drives the fluid downstream to a spray gun where the fluid is emitted as a spray through the nozzle. The pump can be powered in various manners, such as electrically, pneumatically, or hydraulically. Electrically powered pumps typically receive AC power from a power cord connected to a wall outlet to receive constant and unlimited electric power. Sprayers can be configured to spray various fluids such as paint, varnish, finishing, or other type of coating. The sprayed fluid can be a sanitary fluid, such as for sterilization, cleaning, deodorizing, or another health-related application.

SUMMARY

According to an aspect of the disclosure, a fluid sprayer configured to be powered by a battery, the fluid sprayer including an electric motor; a pump operatively connected to the electric motor to be powered by the electric motor; a housing within which the electric motor is disposed; a battery bay configured to receive the battery when the battery is mounted to the fluid sprayer; and a shelter defining a battery chamber configured to contain the battery, the shelter fully covering a top side of the battery with the battery mounted to the fluid sprayer.

According to an additional or alternative aspect of the disclosure, a mounting assembly for a battery of a fluid sprayer includes a housing containing an electric motor and a shelter defining a battery compartment for receiving the battery. The shelter includes a mounting wall formed by the housing; a ceiling formed by the housing; and a guard projecting away from the housing such that an upper cavity having closed upper cavity lateral sides, closed upper cavity longitudinal sides, and a closed upper cavity upper side is formed by the back wall, the guard, and the ceiling, and such that a vertical cavity having closed vertical cavity lateral sides and a closed vertical cavity back side is formed by the drive housing and the guard. The mounting wall is supporting the battery within the battery chamber such that the battery is partially disposed within each of the upper cavity and vertical cavity and air gaps are formed between the battery and the ceiling and between the battery and the guard such that the battery does not contact any of the ceiling and the guard.

DETAILED DESCRIPTION

The present disclosure concerns electrically powered fluid sprayers. The fluid sprayer is powered by a battery mounted to the fluid sprayer. The battery provides electrical power for operation of components of the fluid sprayer, including an electric motor that powers a pump. The pump provides fluid under pressure (e.g., from a reservoir) to a spray gun. The fluid is emitted under pressure from a nozzle of the spray gun (e.g., a handheld spray gun) as a fluid spray. The sprayer is configured to protect the battery such that spray droplets are prevented from falling into or otherwise entering into the battery-sprayer interface. Moisture-sensitive components of the battery are thereby protected from fluid that could otherwise damage the battery. The sprayer includes surfaces that cover the battery-sprayer interface and enclose portions of the battery to prevent fluid from entering into the battery-sprayer interface. The battery powered sprayer can spray various fluids, such as paint, varnish, finishing, or other type of coating. The fluid sprayed can be a sanitary fluid, such as for sterilization, cleaning, deodorizing, or another health-related application.

Figure 1A:
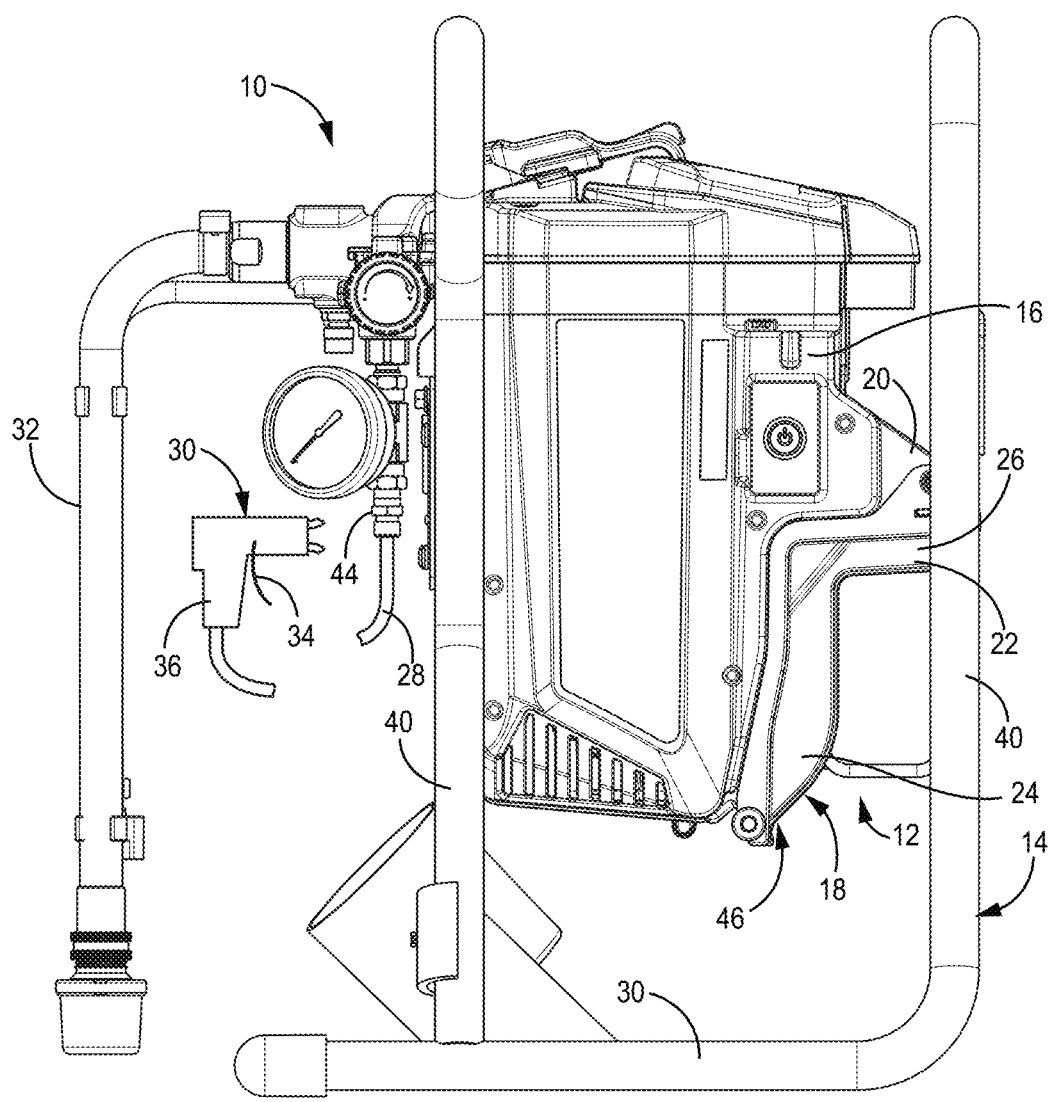
FIG. 1A is a side elevation view of a sprayer.
Figure 1B:
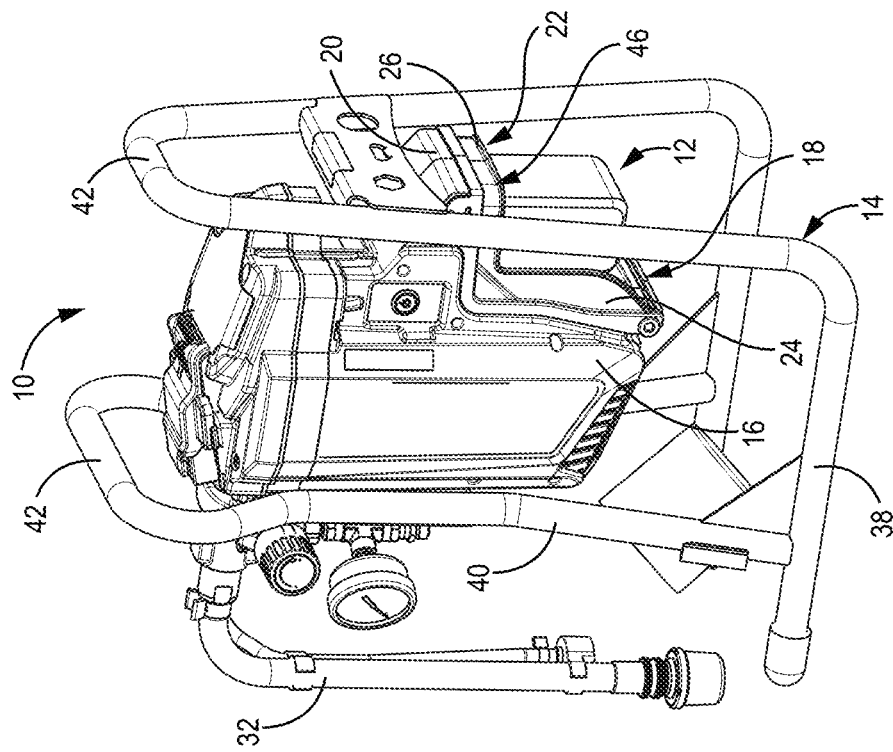
FIG. 1B is a first isometric view of the sprayer shown in FIG. 1A.
Figure 1C:
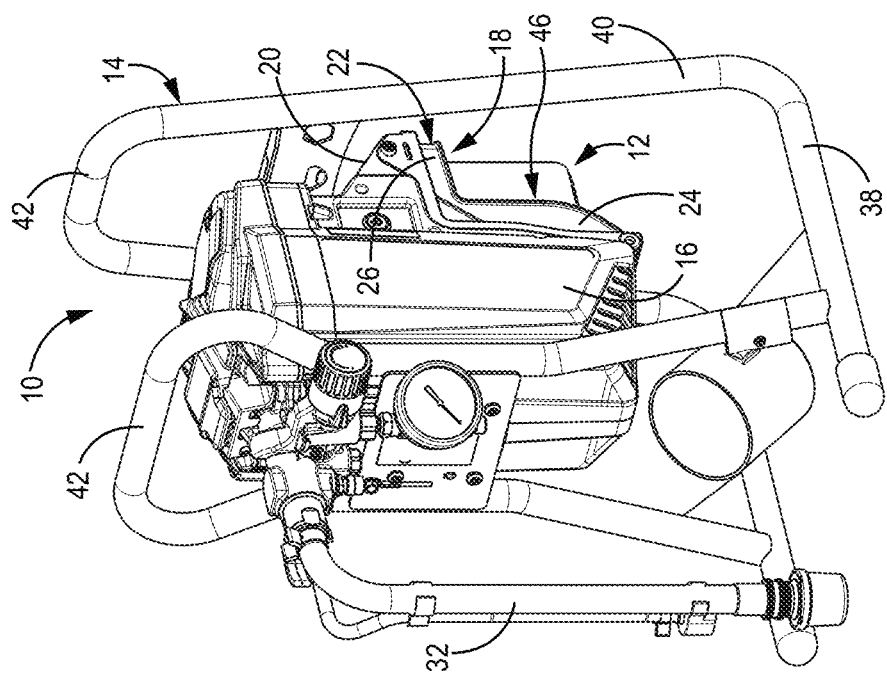
FIG. 1C is a second isometric view of the sprayer shown in FIG. 1B.

FIG. 1A is a side elevation view of fluid sprayer 10. FIG. 1B is a first isometric view of fluid sprayer 10. FIG. 1C is a second isometric view of fluid sprayer 10. FIGS. 1A-1C will be discussed together. Fluid sprayer 10 and battery 12 are shown. Fluid sprayer 10 includes frame 14, housing 16, shelter 18, spray hose 28, spray gun 30, and inlet hose 32. Shelter 18 includes projection and guard 22. Guard 22 forms side rails 24 and awning 26. Spray gun 30 includes trigger 34 and handle 36. Frame 14 includes frame base 38 and arms 40. Each arm 40 include cross-bar 42.

Frame 14 supports other components of fluid sprayer 10 relative to a ground surface. Frame 14 includes frame base 38 that is oriented generally horizontally, parallel to the ground surface. Frame base 38 is formed by tubular legs in the example shown. Arms 40 extend vertically from the frame base 38. Arms 40 include cross-bars that are disposed above housing 16. Cross-bars 42 can be grasped by a user and utilized as a handle to move fluid sprayer 10 around and between job sites.

Inlet hose 32 is configured to extend into a reservoir, such as a bucket, to draw spray fluid from a supply within the reservoir. The inlet hose 32 extends to a pump of the sprayer 10. The pump increases a pressure of the spray fluid and drives the pressurized spray fluid downstream through spray hose 28 to spray gun 30. Spray gun 30 includes a handle 36 that can be grasped by a single hand of the user. Trigger 34 is operably associated with an internal valve within the body of spray gun 30 to release spray fluid from a nozzle of the spray gun 30. The pressure generated by the pump is configured to atomize the spray fluid into droplets for application to the target surface. Some of the droplets do not adhere to the surface and instead deflect or bounce back. The droplets fall within the surrounding area of the surface, which can include sprayer. Such falling droplets can be referred to as "dry fall" or "overspray".

Housing 16 is connected to frame 14 such that housing 16 is supported above the ground surface and is not in contact with the ground surface. Various of the components of sprayer 10 are disposed within and/or supported by housing 16. The electrical components of sprayer 10 are shielded from falling fluid spray. Electrical components powered by battery 12, such as the electric motor of sprayer 10, are disposed within the housing 16.

Battery 12 is mounted to fluid sprayer 10 to provide electric power to components of fluid sprayer 10. The battery 12 is supported by the housing 16. In some examples, the battery 12 can be directly mounted to the housing 16 such that the battery 12 hangs from the housing 16. Battery 12 can be mechanically connected to the housing 16 to be supported by the housing 16. The battery 12 is protected by shelter 18. The shelter 18 covers all upward facing surfaces of the battery 12 to protect the battery 12 from falling spray fluid, such as paint "dry fall", which could otherwise buildup and interfere with the battery 12. While the shelter 18 protects the battery 12 from falling fluid, shelter 18 is configured such that the battery 12 is exposed to the ambient air to allow cooling and easy access for mounting and dismounting, as well as facilitating monitoring of the battery 12 (e.g., in embodiments in which the battery 12 displays an energy storage level).

Shelter 18 can be at least partially formed as a portion of housing 16. Shelter 18 is disposed on an opposite side of sprayer 10 from the outlet 44 from the pump to spray gun 30 and from inlet hose 32. Shelter 18 can be considered to be formed at a front end of sprayer 10 while inlet hose 32 is at a rear end of sprayer 10. Shelter 18 is disposed to enclose various portions of battery 12 and to cover various of the edges of battery 12. In the example shown, shelter 18 extends longitudinally outward beyond an outer side of battery 12, extends laterally relative to both lateral sides of battery 12, and extends downward to cover an edge of the top of battery 12. Projection 20 extends over a top side of battery 12 and the guard 22 wraps around the lateral and outer sides of the battery 12. Projection 20 fully covers the top side of battery 12 and guard 22 partially covers each of the lateral sides and outer side of battery 12.

Sprayer 10 can be configured such that shelter 18 is formed by the same material as housing 16. For example, the material forming shelter 18 can be formed contiguous with the material forming housing 16. The projection 20 can be formed at least partially from the same piece and material that forms the housing 16. Other parts of the shelter 18, such as guard 22, can be formed by the guard piece 46, which can be on or more pieces of material attached to the material that forms the housing 16. In the example shown, guard piece 46 is mounted to housing 16 to form components of shelter 18. In the example shown, side rails 24 and awning 26 are formed by guard piece 46 while projection 20 is formed continuous with and as part of the material of housing 16.

At least a portion of shelter 18 is formed above the battery 12. Projection 20 extends outward from the portion of housing 16 containing the electric motor to cover a top of battery 12, which is a side of battery 12 that faces upwards with battery 12 mounted to sprayer 10. Projection 20 extends away from housing 16 to form at least a portion of shelter 18. Guard 22 extends away from housing 16 to form partially enclosed cavities of the shelter 18. In the example shown, guard 22 extends from a housing 16 disposed above battery 12 and on the lateral sides of battery 12. Guard 22 projects downward such that the top side of battery 12 is fully enclosed and projects forward such that lateral sides of battery 12 are at least partially covered. Awning 26 and side rails 24 are formed as portions of guard 22. In the example shown, side rails 24 and awning 26 are formed contiguous with each other such that guard 22 is a unitary projection extending on three side of battery 12. In some examples, guard piece 46 can be formed as multiple components fixed relative to each other, such as in a clamshell configuration.

Guard 22 extends below the top edge of battery 12 such that guard 22 at least partially covers an outer side of battery 12 that faces outward from shelter 18. Specifically, awning 26 extends downward to at least partially cover the outer side of battery 12. Awning 26 further wraps around the sides of battery 12 to at least partially cover the lateral sides of battery 12. Guard 22 also extends outward such that guard 22 at least partially covers the lateral sides of battery 12. Specifically, side rails 24 are disposed on the two lateral sides of battery 12 and extend relative to housing 16 such that at least a portion of the battery 12 is disposed in a cavity formed directly between side rails 24. Side rails 24 project over a portion of each lateral side of the battery 12. In the example shown, guard 22 includes two side rails 24 (only one of which is shown in FIGS. 1A and 1B) that are disposed on opposite lateral sides of the battery 12. While the projection 20 protects the battery 12 from falling spray fluid, the guard 22 can protect from spray fluid directed or drifting laterally or longitudinally toward the battery 12.

Sprayer 10 provides significant advantages. Shelter 18 protects battery 12 from falling and drifting fluid spray. Shelter 18 fully or partially encloses various surfaces of battery 12 to protect the battery-sprayer interface from the fluid spray. The battery-sprayer interface is enclosed and surfaces of battery 12 are shielded to prevent fluid from accessing the electrical connections at the battery-sprayer interface. The battery 12 is mounted such that battery 12 is protected, while portions of battery 12 are exposed for easy access by the user to allow for battery 12 to be removed for charging and/or replacement.

Figure 2A:
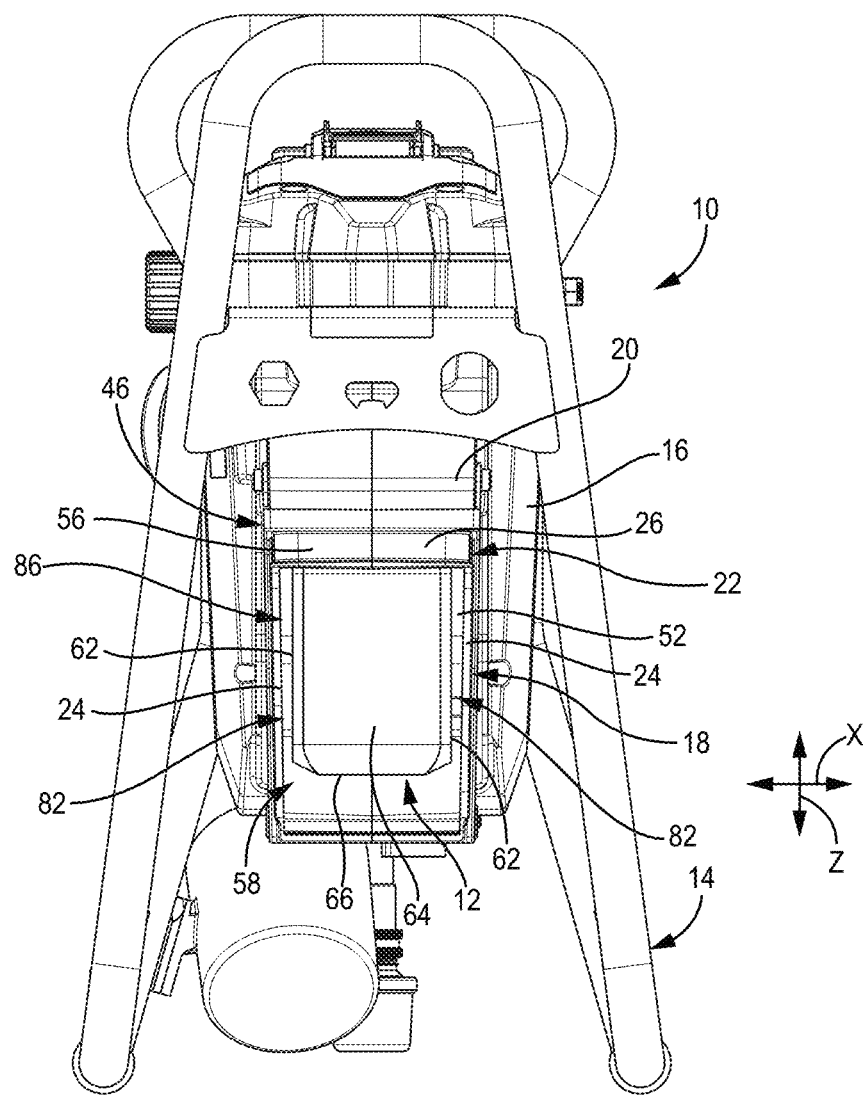
FIG. 2A is a front elevational view of a sprayer.
Figure 2B:
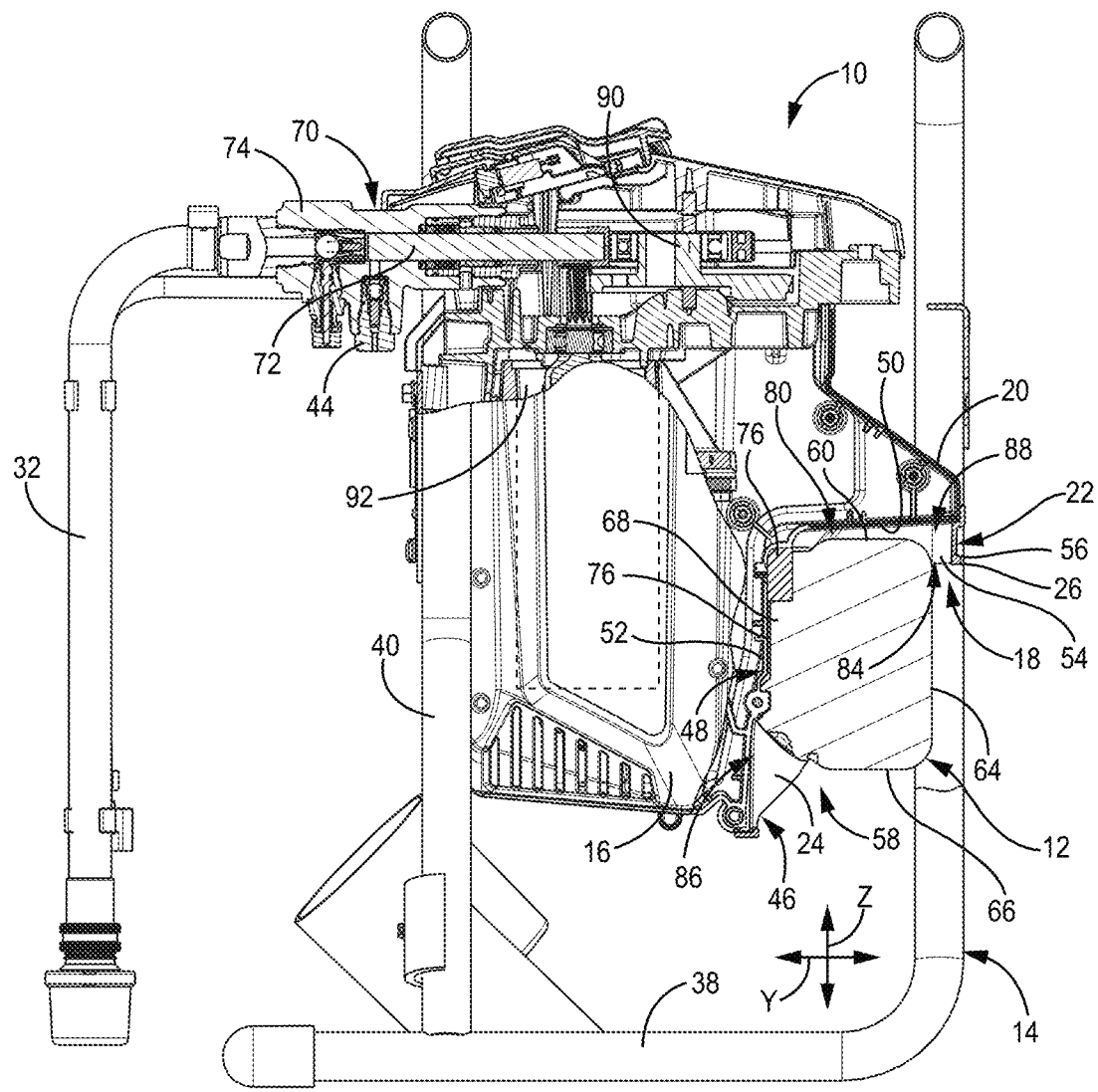
FIG. 2B is a cross-sectional view taken along line B-B in FIG. 2A.

FIG. 2A is a front elevational view of sprayer 10 including the battery 12. FIG. 2B is a cross-sectional view taken along line B-B in FIG. 2A. FIGS. 2A and 2B will be discussed together. Frame 14, housing 16, shelter 18, inlet hose 32, pump 70, drive 90, motor 92, and battery bay 48 of sprayer 10 is shown. Shelter 18 includes projection 20, guard 22, ceiling 50, and mount wall 52. Guard 22 includes side rails 24 and awning 26. Awning 26 includes lateral rails 54 and front rail 56. Shelter 18 defines battery receiving area 58. Top side 60 (FIG. 2B), lateral sides 62 (FIG. 2A), outer side 64, bottom side 66, and mounting side 68 (FIG. 2B) of battery 12 are shown. X-Z coordinate axes are shown in FIG. 2A. The X axis is a lateral axis and the Z axis is a vertical axis. Y-Z coordinate axes are shown in FIG. 2B. The Y axis is a longitudinal axis and the Z axis is a vertical axis.

Battery 12 is mounted to fluid sprayer 10 to provide electric power to various components of fluid sprayer 10. Specifically, battery 12 is electrically connected to motor 92 to provide operating power to motor 92. Electric motor 92 is located entirely within the housing 16 in the example shown. The motor 92 is powered by the battery 12. The motor 92 outputs rotational motion to the drive 90, which is configured to translate the rotational output from motor 92 into a linear reciprocating input to the fluid displacer of pump 70. For example, drive 90 can be an eccentric and crank that converts rotational motion to reciprocating motion. The drive 90 is connected to pump 70 to cause pumping by pump 70. Pump 70 in the example shown includes a piston 72 that is reciprocated by the drive 90 within a cylinder 74 while dual ball check valves control fluid flow.

As shown, the pump 70 is located vertically above the battery 12 and the shelter 18. The pump 70, and further the fluid inlet and outlet of pump 70, are located on the opposite side of the housing 16 from the battery 12. The pump 70 and fluid inlet and fluid outlet of pump 70 are disposed on an opposite side of motor 92 from shelter 18.

Battery 12 is disposed within battery receiving area 58 of shelter 18. Battery receiving area 58 can also be referred to as a battery chamber. In the example shown, the battery receiving area 58 is not located on the bottom of the housing 16. The battery receiving area 58 is not located on the bottom of the sprayer 10. The battery receiving area 58 is not located underneath the sprayer 10 or housing 16 except to the extent that the battery 12 is underneath the projection 20 that extends from a side of housing 16. Battery 12 is mounted such that mounting side 68 of battery 12 interfaces with sprayer 10. Specifically, mounting side 68 of battery 12 interfaces with a battery bay 48 formed in mount wall 52 to connect battery 12 to sprayer 10. The interface between battery 12 and sprayer 10 can be referred to as a battery-sprayer interface. Battery 12 is connected to sprayer 10 by interfacing with connector 76 formed in battery bay 48. Battery bay 48 is formed as a mounting slot that battery 12 can be inserted into to mechanically and electrically connect battery 12 to sprayer 10.

Battery 12 is mechanically connected to sprayer 10 at battery bay 48 to physically support battery 12 on sprayer 10. Battery 12 is electrically connected to components of sprayer 10 by electrical connections formed at battery bay 48. Battery 12 enters into and is removed from battery bay 48 through lower opening 78 (shown in FIG. 3B) of battery bay 48. Battery 12 is configured to move vertically (e.g., along an axis parallel to vertical axis Z) during mounting of battery 12 and dismounting of battery 12. Battery 12 includes a mounting latch that, when released, allows the battery 12 to fall downward due to gravity. No floor or other part of the sprayer 10 blocks the downward fall of the battery 12.

Battery 12 is disposed at a first end of fluid sprayer 10 opposite a second end that inlet hose 32 is disposed at, and thus opposite any reservoir. In the example shown, the battery bay 48 is not located on the bottom of the housing 16. The battery bay 48 is not located on the bottom of the sprayer 10. The battery bay 48 is not located underneath the sprayer 10 or housing 16 except to the extent that the battery 12 is underneath the projection 20 that extends from a side of housing 16.

The portion of housing 16 that houses the electric motor 92 is disposed between battery 12 and inlet hose 32. The motor 92 is disposed such that the motor 92 longitudinally overlaps with battery 12. As such, the motor 92 is disposed such that a line parallel to the longitudinal Y-axis extends through each of the motor 92 and the battery 12. The bottom side 66 of battery hangs below the lower opening 78 of battery bay 48 such that the lower opening 78 is not exposed from the front side of shelter 18 but is instead shielded by battery 12 itself. Battery 12 is mounted to sprayer 10 such that air gaps are disposed on five of six sides of battery 12.

Mount wall 52 is disposed vertically or substantially vertically (e.g., within 15-degrees of vertical). The mount wall 52 is disposed substantially vertically to facilitate any fluid that does enter into battery receiving area 58 flowing downward, in the direction of gravity, and away from battery bay 48. Mount wall 52 extends vertically below the bottom side 66 of battery 12 to facilitate fluid draining away without pooling near battery 12. As discussed in more detail below with regard to FIGS. 3A and 3B, battery bay 48 is formed in a protrusion of the mount wall 52. The protrusion extends away from the mount wall 52 and into the battery receiving area 58. The protrusion spaces the lower opening 78 of battery bay 48 longitudinally from a base portion of mount wall 52. Spacing the lower opening 78 from mount wall 52 further inhibits any potential fluid migration or wicking to battery 12.

In the example shown, shelter 18 is formed from projection 20 and guard 22. Projection 20 is formed as an outward projection of the housing 16. The projection 20 extends outward relative to other portions of the housing 16.

Projection 20 extends from housing 16. Projection 20 extends longitudinally away from the portion of housing 16 that motor 92 is disposed within. Projection 20 extends to form a top portion of shelter 18 that protects battery 12 from falling fluid spray. Battery 12 is disposed below projection 20 and is spaced from projection 20. Projection 20 defines a ceiling 50 that extends beyond the battery 12. The ceiling 50 extends beyond the battery 12 both beyond outer side 64 (longitudinally along axis Y) and laterally beyond lateral sides 62 (laterally along axis X). The area of ceiling in an X-Y horizontal plane is larger than the area of battery 12 in an X-Y horizontal plane such that ceiling 50 fully covers battery 12. Upper gap 80 is disposed vertically between battery 12 and projection 20. Specifically, upper gap 80 is disposed between top side 60 of battery 12 and ceiling 50. As shown, the ceiling 50 is angled inward, toward the main body of the housing 16. Ceiling 50 slopes such that the size of upper gap 80 is larger at outer side 64 of battery 12 than at mounting side 68 of battery 12. It is understood, however, that in other examples the ceiling 50 can be sloped downward away from the main body of housing 16, such that the end of ceiling 50 at awning 26 is vertically lower than the end at mount wall 52.

Guard piece 46 is mounted to housing 16 to form at least a portion of shelter 18. Side rails 24 and awning 26 are formed by guard piece 46. Guard piece 46 wraps around projection 20. Guard 22 is formed as a protective rail that extends relative to housing 16. Side rails 24 are disposed on and spaced from lateral sides 62 of battery 12. Awning 26 is disposed forward of and spaced from outer side 64 of battery 12. Awning 26 is further disposed laterally outward from and spaced from lateral sides 62 of battery 12. In the example shown, side rails 24 and awning 26 are formed by guard piece 46, though it is understood that one or more of each side rail 24 and awning 26 can be formed as part of and unitary with the material forming housing 16.

Guard 22 extends around three sides of battery 12. Specifically, guard 22 extends over the two lateral sides 62 of battery and outer side 64 of battery 12 to at least partially cover each of the lateral sides 62 and outer side 64. Guard 22 covers first and second edges of each lateral side 62, the first edge being a rear edge between the lateral side 62 and mounting side 68, and the second edge being a top edge between lateral side 62 and top side 60. Guard 22 covers the top edge of outer side 64 that is disposed between outer side 64 and top side 60. Guard 22 covers three of the four edges of the top side 60. Guard 22 partially covers the edges disposed between lateral sides 62 and outer side 64. Guard 22 has a greater vertical length than the height of battery 12 taken between bottom side 66 and top side 60.

Battery 12 is disposed laterally between side rails 24. Side rails 24 extend longitudinally relative to mount wall 52. The vertically lower ends of side rails 24 are disposed vertically below the bottom side 66 of battery 12. The battery 12 does not contact the side rails 24. As such, lateral gaps 82 are formed between the lateral sides 62 of battery 12 and side rails 24. Lateral gaps 82 are formed as voids disposed on both lateral sides 62 of battery 12. Neither lateral side 62 of battery 12 contacts the guard 22. The lateral gaps 82 space battery 12 from side rails 24 to avoid fluid that may be running down the guard 22 from wicking to the moisture-sensitive battery 12.

Awning 26 projects vertically downward relative to ceiling 50. Awning 26 projects further vertically than the vertical height of upper gap 80. As such, upper gap 80 is fully enclosed. Awning projects vertically downward to cover the edges of top side 60. Awning 26 projects vertically downward such that the edges of top side 60 are fully enclosed within an upper portion of the battery receiving area 58. Fully enclosing top side 60 prevents spray fluid from settling on top side 60, thereby preventing accumulation that could otherwise pool and flow to the battery-sprayer interface.

Top gap 84 is formed between awning 26 and battery 12. Top gap 84 extends around three sides of battery 12, such that an outer portion of top gap 84 is disposed between outer side 64 and a front rail 56 of awning 26 and such that lateral portions of top gap 84 are disposed between lateral sides 62 of battery 12 and lateral rails 54 of awning 26. Top gap 84 facilitates airflow around battery 12 to provide cooling to battery 12 while also preventing fluid droplets from traveling to top side 60 because the droplets would have to flow against gravity through the top gap 84 to access the top side 60.

Non-contact between battery 12 and projection 20 and between battery 12 and guard 22 avoids fluid that may be running down these surfaces from wicking to the battery 12, thereby protecting the battery 12. Also, such separation allows for air flow around the battery 12 and thus cooling of the battery 12, which may otherwise experience heat rise during intense, continuous operation.

Shelter 18 defines the battery receiving area 58 that the battery 12 is disposed within. The battery receiving area 58 includes a vertical cavity 86 into which the battery 12 is elevated and shifts vertically though during install. The vertical cavity 86 is open longitudinally such that battery 12 projects out of vertical cavity 86 while battery 12 is mounted to sprayer 10. Vertical cavity 86 is open on a lower vertical side to allow battery 12 to shift vertically into and out of vertical cavity 86 during mounting and dismounting of battery 12. Vertical cavity 86 is closed at a top end by ceiling 50. The battery receiving area 58 further includes an upper cavity 88 that the top side 60 of battery 12 is disposed within while the battery 12 is mounted to sprayer 10. The upper cavity 88 is formed by awning 26 and ceiling 50. The upper cavity 88 encloses the top side 60 of battery 12 to protect the battery 12 from falling spray fluid. The upper cavity 88 is closed on five of six sides of upper cavity 88. The upper cavity 88 is open on a bottom vertical side, oriented towards the ground surface to allow the battery 12 to pass into and out of upper cavity 88 during mounting and dismounting of battery 12. The upper cavity 88 and vertical cavity 86 being partially enclosed cavities protects the moisture-sensitive areas of battery 12 from falling and/or drifting fluid spray, while leaving battery 12 exposed for easy access for removal and installation. The upper cavity 88 and vertical cavity 86 intersect and overlap in an upper area of battery receiving area 58.

Battery receiving area 58 is open on a bottom side directly below battery 12. Shelter 18 does not include a floor and does not cover the bottom side 66 of battery 12. The bottom side 66 of battery 12 is exposed such that the bottom side 66 of battery 12 can be accessed by the user for mounting and dismounting without manipulating other components of sprayer 10. The absence of a floor allows the battery 12 to be removed and installed vertically (along axis Z). The absence of a floor also prevents the trapping of fluid in or near the battery bay 12 which otherwise risks pooling and potential exposure of the battery 12 to the fluid if the sprayer 10 were picked up or otherwise changed in orientation. The lower end of battery receiving area 58, and of vertical cavity 86, is open to facilitate fluid exiting from the battery receiving area 58 if any overspray did enter into the battery receiving area 58.

Sprayer 10 does not include an encloser that fully encloses battery 12 within battery receiving area 58. In the example shown, no door protects the battery 12. To the extent that the battery 12 is protected by the shelter 18, it is protected by static structures, not articulating structures such as a door or window. This avoids introducing hinges and other potential failure points and avoids introducing components that can accumulate the spray fluid over time. As explained above, the battery 12 is still protected by fluid spray hazards despite not being behind a door. Further, sprayer 10 not including a door means that battery can be accessed for removal and installation without having to manipulate or actuate other components of sprayer 10 prior to accessing battery 12. User access to battery 12 thus requires less time and effort, simplifying the removal and installation processes. Having no door facilitates cooling of battery 12 by allowing ambient airflow around the enclosed portions of battery 12.

Battery 12 is mounted such that battery 12 is protected from any falling and drifting fluid droplets. While moisture-sensitive portion of battery 12 are enclosed, such as mounting side 68 and top side 60 (along which fluid can flow to mounting side 68), various other portions of battery are exposed to facilitate mounting and dismounting of battery 12. In the example shown, a majority of the surface area of outer side 64 of battery 12 is exposed and a minority of the surface area of outer side 64 is enclosed. The enclosed portions of outer side 64 are covered by guard 22. In the example shown, a majority of the surface area of each lateral side 62 of battery 12 is exposed and a minority of the surface area of outer side 64 is enclosed. The enclosed portions of lateral sides 62 are covered by guard 22. The user can access battery 12 by grasping any of the exposed portions of battery 12 and pulling battery 12 vertically downward and away from ceiling 50. The majority of each of lateral sides 62 and outer side 64 being exposed provides a large grip area for the user that facilitates single-hand installation and removal while also protecting the moisture-sensitive surfaces of battery 12.

As best seen in FIG. 2B, battery 12 is disposed within battery receiving area 58 and mounted to sprayer 10 such that battery 12 is neither higher nor lower than the portions of housing 16 containing motor 92. As such, a full vertical height of battery is overlapped by housing 16 with battery 12 mounted to sprayer 10.

Sprayer 10 provides significant advantages. Battery 12 is disposed within battery receiving area 58 such that the portion of battery 12 interfacing with sprayer 10 is shielded from any falling and/or drifting fluid droplets. Battery 12 is fully covered by projection 20 such that top side 60 of battery 12 is not exposed outside of shelter 18. All edges of top side 60 are enclosed within battery receiving area 58 such that fluid cannot drift onto or land on top side 60, thus preventing pooling on or flow along top side 60 to the mounting side 68 of battery 12. The edges between lateral sides 62 and mounting side 68 and between top side 60 and mounting side 68 are fully enclosed within battery receiving area 58 such that fluid droplets are inhibited from moving to the moisture-sensitive components of battery 12. While battery 12 is protected from fluid, portions of battery 12 are exposed to facilitate easy access to the battery 12 by the user, allowing for mounting and dismounting without actuating other components to access battery receiving area 58. Battery 12 is also exposed to the ambient environment such that the ambient air can flow to and over battery 12, facilitating cooling of battery 12.

Figure 3A:
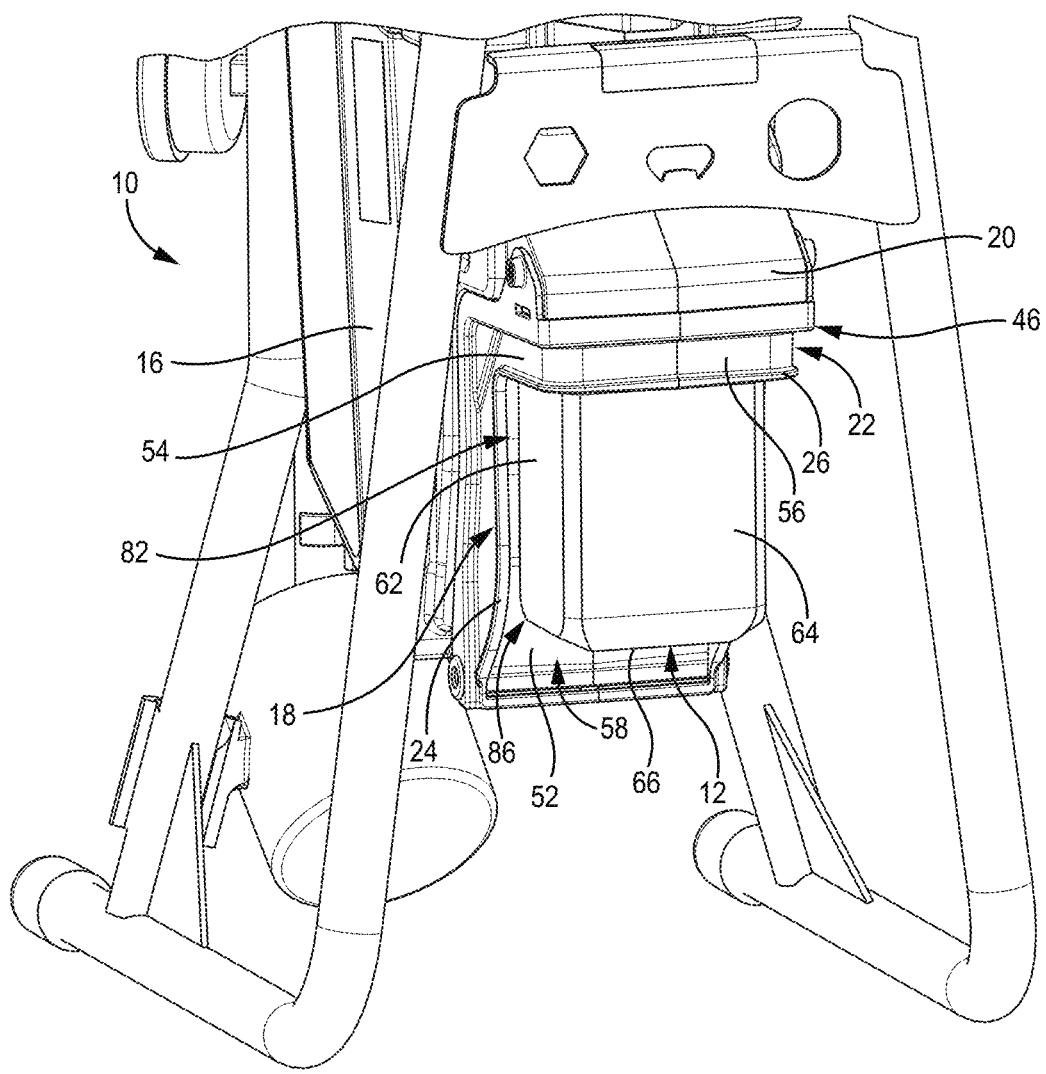
FIG. 3A is an enlarged isometric view of a sprayer showing a battery mounted to the sprayer.
Figure 3B:
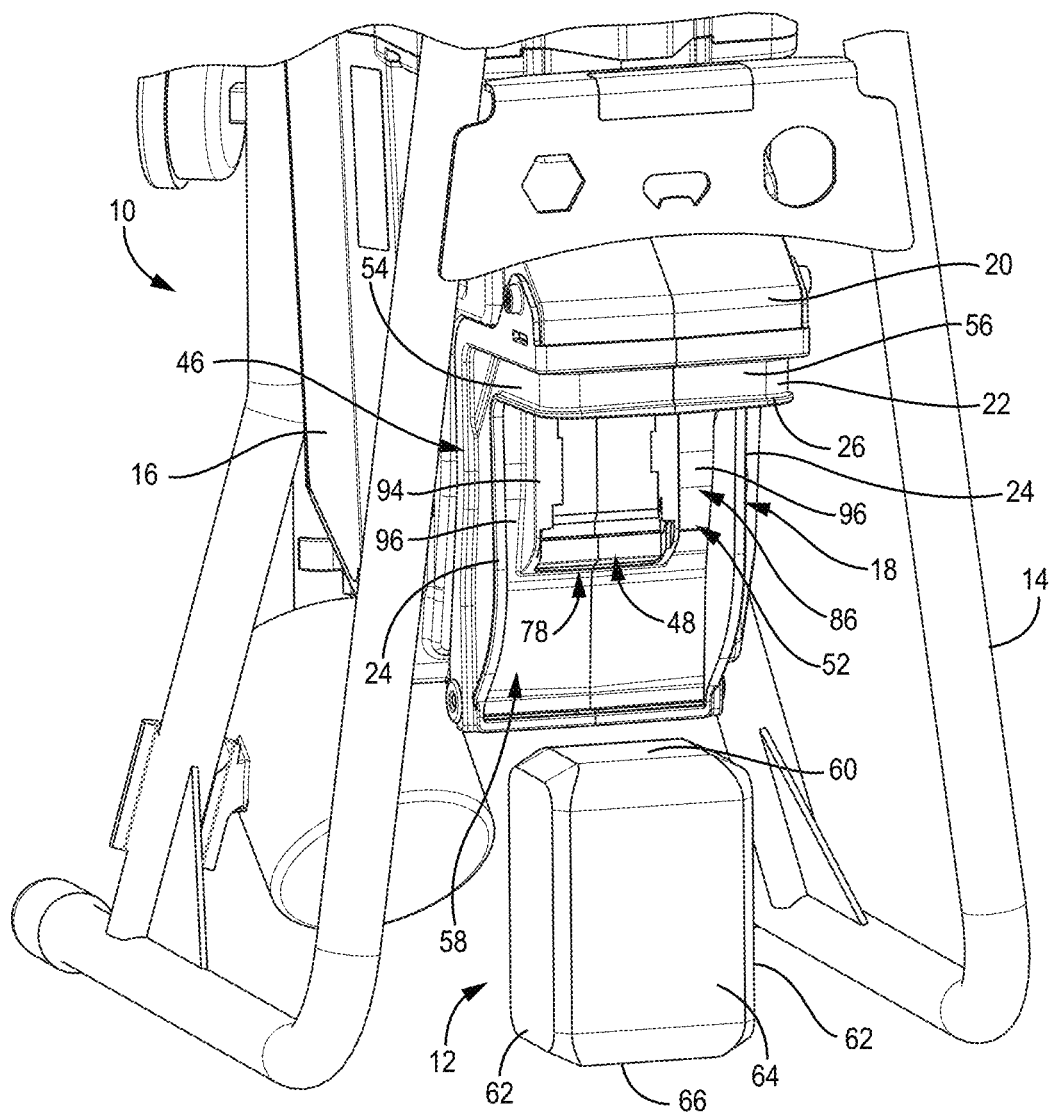
FIG. 3B is an enlarged isometric view of the sprayer shown in FIG. 3A showing the battery dismounted from the sprayer.

FIG. 3A is an enlarged isometric view of sprayer 10 showing the battery 12 mounted to the sprayer 10. FIG. 3B is an enlarged isometric view of sprayer 10 similar to FIG. 3A but showing the battery 12 dismounted from the sprayer 10. Battery 12 is mounted to sprayer 10 within battery receiving area 58. Specifically, battery 12 mounts to sprayer 10 by interfacing with sprayer 10 within battery bay 48. Battery 12 is mechanically and electrically mounted to sprayer 10 at battery bay 48. Specifically, battery 12 is connected to sprayer 10 by interfacing with connector 76 formed in battery bay 48.

Battery 12 is connected to mounting wall 52. Battery bay 48 is formed in protrusion 94 that extends from base 96 of mounting wall 52. Specifically, protrusion 94 projects longitudinally relatively to the base 96 of mounting wall 52. Protrusion 94 extends into battery receiving area 58 from mounting wall 52. Protrusion 94 can be formed as a portion of housing 16. Protrusion 94 can be formed unitary with and from the same material piece as housing 16. Protrusion 94 extends longitudinally such that battery bay 48 is spaced longitudinally from base 96 of mounting wall 52. Specifically, lower opening 78, through which battery 12 initially enters into battery bay 48, is spaced longitudinally from the surface forming the base 96 of mounting wall 52. Spacing battery bay 48 longitudinally from that base 96 of mounting wall 52 encourages fluid flow downward away from the battery bay 48 and prevents fluid from wicking to the moisture-sensitive components of battery 12. The battery 12 connects to connector 76 within protrusion 94. The connector 76 provides mechanical support to the battery 12 and also makes electrical connections to transfer power from the battery 12 to the electrical components of the sprayer 10 inside the housing 16. For example, the battery 12 can connect to connector 76 by a mounting latch that, when released, allows the battery 12 to fall downward due to gravity. No floor or other part of the sprayer 10 blocks the downward fall of the battery 12.

Battery 12 is mounted and dismounted by shifting battery 12 vertically along a vertical Z axis, such as along a mounting axis oriented vertically. Battery 12 is dismounted by moving vertically downward. For example, a user can access the uncovered portions of lateral sides 62 and outer side 64 and/or the fully uncovered bottom side 66 to grasp battery 12. The user can mechanically disconnect battery 12 from sprayer 10 and then pull battery 12 downward out of battery bay 48. To reconnect the battery 12 (or mount a different battery 12) to the sprayer 10, the battery 12 is placed below the shelter 18 and then moved upwards into the battery receiving area 58 such that a portion of battery 12 enters into battery bay 48 to engage the connector 76 with complementary mechanical and electrical connections of the battery 12.

The battery 12 can be mounted by dual-directional movement. In the example shown, the awning 26 extends downward to cover an outward facing side 64 of the battery 12. During mounting, the battery 12 is moved in a forward-then-up motion (e.g., longitudinally along the Y-axis and then vertically along the Z-axis) so that the battery 12 clears the downward extending part of the awning 26. To dismount the battery 12, the battery 12 is moved in a downward-then-back motion (e.g., vertically along the Z-axis and then longitudinally along the Y-axis) to again clear the downward extending part of the awning 26.

Discussion of Non-Exclusive Examples

The following are non-exclusive descriptions of possible examples of the present invention.

A fluid sprayer configured to be powered by a battery, the fluid sprayer includes an electric motor; a pump operatively connected to the electric motor to be powered by the electric motor; a housing within which the electric motor is disposed; a battery bay configured to receive the battery when the battery is mounted to the fluid sprayer; and a shelter defining a battery chamber configured to contain the battery, the shelter fully covering a top side of the battery with the battery mounted to the fluid sprayer to protect the battery from falling spray fluid.

The fluid sprayer of the preceding paragraph can optionally include, additionally and/or alternatively, any one or more of the following features, configurations and/or additional components:

The shelter includes a ceiling located directly over the battery, the ceiling formed by the housing.

The shelter does not include a floor directly below the battery.

The shelter includes a first side rail on a first lateral side of the battery and a second side rail on a second lateral side of the battery such that the battery is disposed directly between the first side rail and the second side rail.

The first lateral side of the battery is partially exposed and the second lateral side of the battery is partially exposed.

A first lateral gap is formed between the first side rail and the first lateral side of the battery such that the battery does not contact the first side rail, and a second lateral gap is formed between the second side rail and the second lateral side of the battery such that the battery does not contact the first side rail.

The shelter includes an awning that projects downward relative to a ceiling of the shelter and at least partially defines the battery chamber.

The awning is disposed on a front side of the shelter, a first lateral side of the shelter, and a second lateral side of the shelter.

The awning projects downward beyond a top surface of the battery such that the awning partially covers the first lateral side of the battery, the second lateral side of the battery, and an outer side of the battery oriented away from the housing.

The awning is spaced from and does not contact the battery.

The battery is exposed with the battery mounted to the fluid sprayer.

Each of an outer surface of the battery, a first lateral surface of the battery, and a second lateral surface of the battery are partially exposed.

The battery is mounted on a wall that is one of vertical and substantially vertical.

The wall is formed by the housing.

The battery does not contact any surfaces other than the wall while mounted.

The battery bay is formed in a protrusion of the wall, the protrusion projecting from the wall into the battery chamber such that the battery bay is spaced from a base of the wall.

The battery bay is oriented vertically and includes a lower mounting opening such that the battery enters into and exits from the battery bay by vertical movement.

The shelter is at least partially formed by a guard piece mounted to the housing.

A guard of the guard piece projects away from the housing such that that guard at least partially encloses portions of the battery chamber.

The guard includes a first side rail extending over a first lateral side of the battery to partially cover the first lateral side of the battery; a second side rail extending over a second lateral side of the battery to partially cover the second lateral side of the battery; and an awning extending over an outer side of the battery, the first lateral side of the battery, and the second lateral side of the battery to partially cover each of the outer side of the battery, the first lateral side of the battery, and the second lateral side of the battery.

The guard is spaced from the battery such that the battery does not contact the guard.

A mounting assembly for a battery of a fluid sprayer includes a housing containing an electric motor; and a shelter defining a battery compartment for receiving the battery. The shelter includes a mounting wall formed by the housing; a ceiling formed by the housing; and a guard projecting away from the housing such that an upper cavity having closed upper cavity lateral sides, closed upper cavity longitudinal sides, and a closed upper cavity upper side is formed by the back wall, the guard, and the ceiling, and such that a vertical cavity having closed vertical cavity lateral sides and a closed vertical cavity back side is formed by the drive housing and the guard. The mounting wall is supporting the battery within the battery chamber such that the battery is partially disposed within each of the upper cavity and vertical cavity and air gaps are formed between the battery and the ceiling and between the battery and the guard such that the battery does not contact any of the ceiling and the guard.

The mounting assembly of the preceding paragraph can optionally include, additionally and/or alternatively, any one or more of the following features, configurations and/or additional components:

The guard is formed by a guard piece mounted to the housing.

The shelter does not include a floor.

While the invention(s) has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention(s) without departing from the essential scope thereof. Therefore, it is intended that the invention(s) not be limited to the particular embodiment(s) disclosed, but that the invention(s) may include all embodiments falling within the scope of the appended claims. Any single feature, or any combination of features from one embodiment show herein, may be utilized in a different embodiment independent from the other features shown in the embodiment herein. Accordingly, the scope of the invention(s) and any claims thereto are not limited to the particular to the embodiments and/or combinations of the features shown herein, but rather can include any combination of one, two, or more features shown herein.

The invention claimed is:

1. A fluid sprayer configured to be powered by a battery, the fluid sprayer comprising:
   an electric motor;
   a pump operatively connected to the electric motor to be powered by the electric motor;
   a housing within which the electric motor is disposed;
   a battery bay configured to receive the battery when the battery is mounted to the fluid sprayer; and
   a shelter defining a battery chamber configured to contain the battery, the shelter fully covering a top side of the battery with the battery mounted to the fluid sprayer to protect the battery from falling spray fluid, the shelter including a ceiling located directly over the battery chamber and at least partially defining the battery chamber, the ceiling extending longitudinally and laterally beyond a top side of the battery with the battery mounted to the fluid sprayer;
   wherein the battery chamber includes a first opening oriented vertically and a second opening oriented longitudinally away from the housing;
   wherein the battery chamber extends vertically below the battery such that a bottom side of the battery is disposed vertically above a lower end of the housing with the battery mounted to the fluid sprayer; and
   wherein the shelter is configured such that the shelter at least partially covers a first lateral side of the battery and a second lateral side of the battery with the battery mounted to the fluid sprayer, and the shelter is spaced from the battery with the battery mounted to the fluid sprayer such that air gaps are formed between the shelter and the first lateral side of the battery and between the shelter and the second lateral side of the battery.

2. The fluid sprayer of claim 1, wherein the ceiling is formed by the housing.

3. The fluid sprayer of claim 1, wherein the shelter does not include a floor directly below the battery.

4. The fluid sprayer of claim 1, wherein the shelter includes a first side rail on a first lateral side of the battery and a second side rail on a second lateral side of the battery such that the battery is disposed directly between the first side rail and the second side rail.

5. The fluid sprayer of claim 1, wherein the battery extends outside of the battery chamber with the battery mounted to the fluid sprayer.

6. The fluid sprayer of claim 5, wherein each of an outer side of the battery, the first lateral side of the battery, and the second lateral side of the battery are partially exposed outside of the battery chamber.

7. The fluid sprayer of claim 1, wherein the battery bay is disposed on a wall formed by the housing.

8. The fluid sprayer of claim 7, wherein the wall is one of vertical and substantially vertical.

9. The fluid sprayer of claim 7, wherein the battery does not contact any surfaces defining the battery chamber other than the wall while mounted to the fluid sprayer.

10. The fluid sprayer of claim 7, wherein the battery bay is formed in a protrusion of the wall, the protrusion projecting from the wall into the battery chamber such that the battery bay is spaced from a base of the wall.

11. The fluid sprayer of claim 1, wherein the shelter is at least partially formed by a guard piece mounted to the housing, and wherein a guard of the guard piece projects away from the housing such that that guard at least partially encloses portions of the battery chamber.

12. The fluid sprayer of claim 1, further comprising:
a frame connected to the housing, the frame configured to support the housing relative to a support surface.

13. The fluid sprayer of claim 12, wherein the frame includes at least one leg.

14. The fluid sprayer of claim 1, further comprising:
a first handle and a second handle, the first handle and the second handle configured to be grasped during lifting of the fluid sprayer.

15. The fluid sprayer of claim 1, further comprising:
a spray gun including a trigger configured to control release of the fluid from the spray gun; and
a hose extending between and fluidly connecting the pump and the spray gun.

16. The fluid sprayer of claim 1, wherein the battery bay is oriented vertically and includes a lower mounting opening such that the battery can enter into the battery bay by vertical movement towards the ceiling and such that the battery can exit from the battery bay by vertical movement away from the ceiling.

17. The fluid sprayer of claim 1, wherein the battery chamber is not defined by an articulating structure.

18. The fluid sprayer of claim 1, wherein the pump is at least partially disposed in the housing.

19. A fluid sprayer configured to be powered by a battery, the fluid sprayer comprising:
an electric motor;
a pump operatively connected to the electric motor to be powered by the electric motor;
a housing within which the electric motor is disposed;
a battery bay configured to receive the battery when the battery is mounted to the fluid sprayer; and
a shelter defining a battery chamber configured to contain the battery, the shelter fully covering a top side of the battery with the battery mounted to the fluid sprayer to protect the battery from falling spray fluid;
wherein the battery chamber includes a lower opening oriented vertically downward, the lower opening disposed vertically below a bottom side of the battery with the battery mounted to the fluid sprayer;
wherein the battery chamber includes an outer opening oriented longitudinally away from the housing, the outer opening spaced longitudinally outward from an outer side of the battery with the battery mounted to the fluid sprayer; and
wherein the shelter is configured such that the shelter at least partially covers a first lateral side of the battery and a second lateral side of the battery with the battery mounted to the fluid sprayer, and the shelter is spaced from the battery with the battery mounted to the fluid sprayer such that air gaps are formed between the shelter and the first lateral side of the battery and between the shelter and the second lateral side of the battery.

20. The fluid sprayer of claim 19, wherein a ceiling of the shelter is disposed vertically above the battery, the ceiling at least partially defining the battery chamber, and an area of the ceiling defining the battery chamber is greater than an area of the top side of the battery oriented towards the ceiling.

* * * * *